(12) United States Patent
Luk et al.

(10) Patent No.: US 8,078,693 B2
(45) Date of Patent: Dec. 13, 2011

(54) INSERTING A MULTIMEDIA FILE THROUGH A WEB-BASED DESKTOP PRODUCTIVITY APPLICATION

(75) Inventors: Jonathan M Luk, Kirkland, WA (US); Jun Ge, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 116 days.

(21) Appl. No.: 12/102,857

(22) Filed: Apr. 14, 2008

(65) Prior Publication Data

US 2009/0259731 A1    Oct. 15, 2009

(51) Int. Cl.
*G06F 15/16* (2006.01)

(52) U.S. Cl. ........ 709/219; 709/217; 709/218; 709/230; 709/238; 705/14; 715/500; 715/513

(58) Field of Classification Search .......... 709/217–219, 709/230–238; 705/14; 715/500, 513, 839
See application file for complete search history.

(56) References Cited

U.S. PATENT DOCUMENTS

| | | | |
|---|---|---|---|
| 5,727,224 A | 3/1998 | Tsuji | |
| 6,760,043 B2 | 7/2004 | Markel | |
| 6,931,603 B2 | 8/2005 | Boegelund | |
| 7,089,504 B1 * | 8/2006 | Froloff | 715/839 |
| 7,266,557 B2 | 9/2007 | Aschen et al. | |
| 7,266,761 B2 | 9/2007 | Levine et al. | |
| 7,853,564 B2 * | 12/2010 | Mierau et al. | 707/638 |
| 2001/0027493 A1 * | 10/2001 | Wallace | 709/247 |
| 2001/0051985 A1 | 12/2001 | Haverstock et al. | |
| 2003/0177448 A1 | 9/2003 | Levine et al. | |
| 2003/0233616 A1 | 12/2003 | Gilinsky | |
| 2004/0142796 A1 * | 7/2004 | Cheng | 482/54 |
| 2004/0143796 A1 * | 7/2004 | Lerner et al. | 715/538 |
| 2005/0018233 A1 * | 1/2005 | Parry et al. | 358/1.14 |
| 2005/0028088 A1 | 2/2005 | Nagayama | |
| 2005/0044178 A1 * | 2/2005 | Schweier | 709/218 |
| 2005/0102612 A1 * | 5/2005 | Allan et al. | 715/513 |
| 2006/0035627 A1 * | 2/2006 | Prasad | 455/414.2 |
| 2006/0085731 A1 | 4/2006 | Cui et al. | |
| 2006/0253411 A1 * | 11/2006 | Roy-Chowdhury et al. | 707/1 |
| 2006/0282759 A1 * | 12/2006 | Collins et al. | 715/500 |
| 2007/0174774 A1 * | 7/2007 | Lerman et al. | 715/723 |
| 2007/0211630 A1 * | 9/2007 | Seo | 370/230 |

(Continued)

FOREIGN PATENT DOCUMENTS

EP     1 170 672 A1    1/2002

(Continued)

OTHER PUBLICATIONS

"International Search Report", dated Aug. 25, 2009 in Application No. PCT/US2009/037225, pp. 1-11.

(Continued)

*Primary Examiner* — Wing Chan
*Assistant Examiner* — Razu Miah
(74) *Attorney, Agent, or Firm* — Hope Baldauff Hartman, LLC

(57) ABSTRACT

Technologies are described herein for inserting a multimedia file through a web-based desktop productivity application. A request for the multimedia file is received from a client computer over a network. A request for the multimedia file is transmitted to a server computer over the network. The request for the multimedia file is transmitted via a proxy web service. The multimedia file is received from the server computer over the network upon transmitting the request for the multimedia file. The multimedia file is inserted in a document edited by the web-based desktop productivity application.

14 Claims, 8 Drawing Sheets

U.S. PATENT DOCUMENTS

| | | | | |
|---|---|---|---|---|
| 2008/0263650 | A1* | 10/2008 | Kerschbaum | 726/9 |
| 2008/0281686 | A1* | 11/2008 | Houtzer et al. | 705/14 |
| 2009/0063274 | A1* | 3/2009 | Dublin et al. | 705/14 |
| 2009/0086029 | A1* | 4/2009 | Wei et al. | 348/207.1 |
| 2009/0111433 | A1* | 4/2009 | Muhonen et al. | 455/414.1 |
| 2009/0172107 | A1* | 7/2009 | Manning et al. | 709/206 |

FOREIGN PATENT DOCUMENTS

| | | |
|---|---|---|
| KR | 10-2008-0010614 A | 1/2008 |
| WO | WO 02/03238 A1 | 1/2002 |

OTHER PUBLICATIONS

"Insert clip art in a Visio drawing", 2007, Microsoft Corporation, p. 1.

"Design a form based on a Web service", 2007, Microsoft Corporation, pp. 4.

"WebEdit Anywhere", 2007, Talisman Technology Integrators, LLC, pp. 2.

"Website Hosting Guides—Using Microsoft FrontPage", Website Source, Inc., 1998-2007, pp. 8.

Fonseca, et al., "Retrieving ClipArt Images by Content," 2004, Proceedings of CIVR '2004, pp. 500-507.

"Website Hosting Guides—Using Microsoft FrontPage", retrieved Dec. 20, 2007 from http://www.websitesource.com/tutorials/frontpage.shtml, 8 pages.

Chinese Official Action dated Sep. 20, 2011 in Chinese Application No. 200980113633.0.

European Search Report dated Sep. 13, 2011 in European Application No. 09733317.3.

Heslop et al. "Word 2003 Bible—Inserting Clip Art and Pictures", Jan. 1, 2003, Word 2003 Bible, Wiley Publishing, Indianapolis, IN, Chapter 17, pp. 441-443.

Krasnoff, Barbara, "Preview: Zoho Notebook Takes on Microsoft's OneNote," Feb. 1, 2007, retrieved from http://www.cm.com/197002511/printablearticle.htm, 2 pages.

Cyenne-McCall, Lawrence, "Synchronous 3D Document Collaboration," Nov. 2008, Thesis, Department of Computer Science Pace University, 42 pages.

* cited by examiner

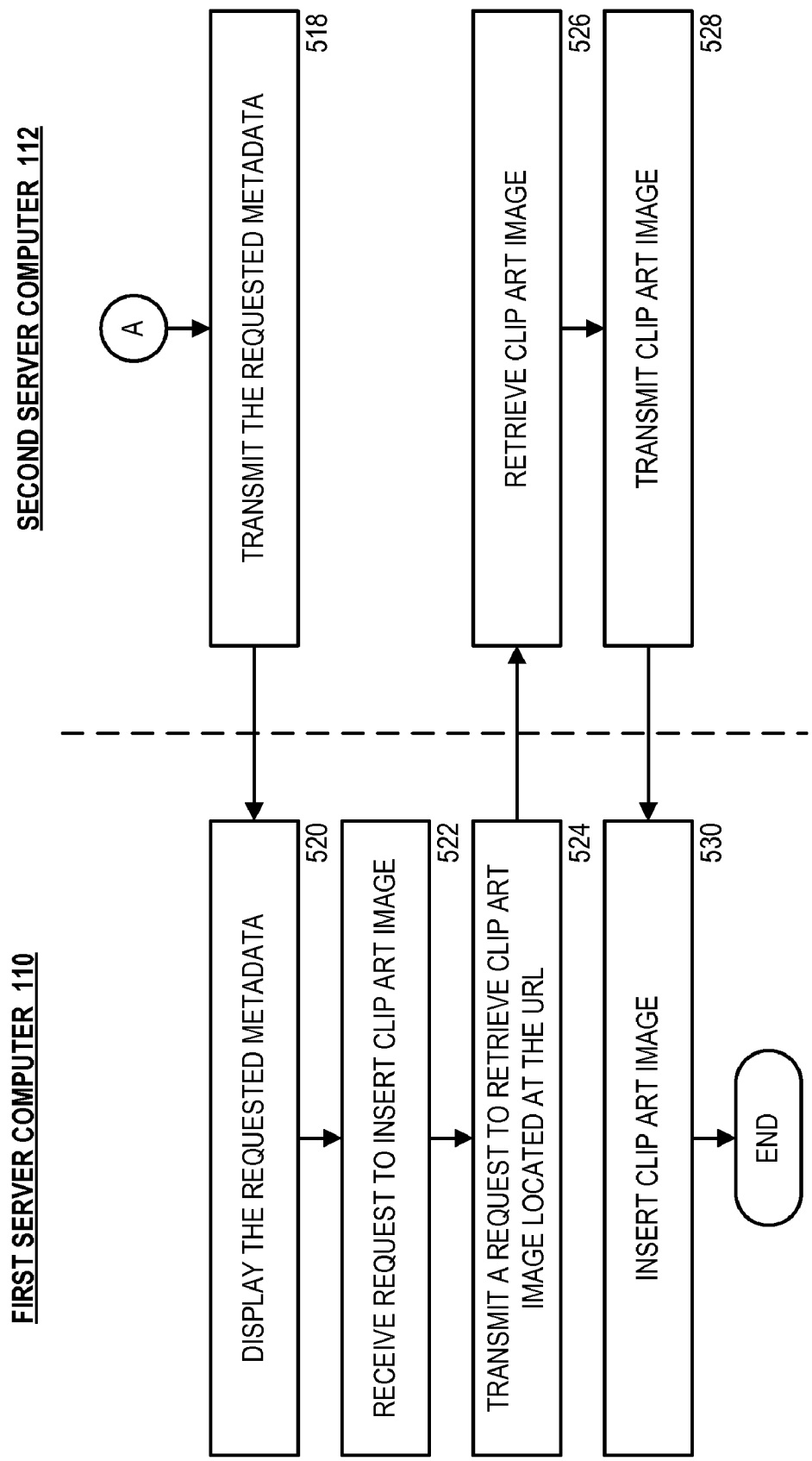

INSERTING A MULTIMEDIA FILE THROUGH A WEB-BASED DESKTOP PRODUCTIVITY APPLICATION

BACKGROUND

Desktop productivity applications (hereinafter referred to as "productivity applications") have transformed the way people draft documents, build spreadsheets, create presentations, and perform a variety of other personal and business-related tasks. In particular, productivity applications enable users to generate high-quality work product in an efficient and cost-effective manner. Examples of productivity applications include word processing applications, spreadsheet applications, presentation applications, and the like. Also, groups of productivity applications are commonly sold as bundles. Examples of such bundles include OFFICE from MICROSOFT CORPORATION and LOTUS SMARTSUITE from INTERNATIONAL BUSINESS MACHINES INC.

If a user wants to access a productivity application on a given computer, the user conventionally locally installs the productivity application on the computer. If the user wants to access the productivity application on another computer, then the user will need to locally install the productivity application on the other computer. This results in a number of potential drawbacks. In one example, if the user owns multiple computers, the user may need to install the productivity application on every computer. This may cause problems if some of the computers do not have the processing capability to execute the productivity application or the disk space to store the productivity application. Installing multiple copies also adds significant expense.

In another example, if the user borrows a computer from a colleague, the user has access the productivity application on the computer only if the colleague has installed the productivity application. If the colleague has not installed the productivity application, the user may purchase and install another copy of the productivity application. However, this option is not ideal because it adds substantial expense, especially if the computer is borrowed for only a short time. Further, the colleague may not want the productivity application installed on her computer.

In yet another example, the user has no access to her own computer (e.g., the user is on a vacation), so the user relies on a publicly-accessible computer, such as those commonly found in libraries and Internet cafes. In many publicly-accessible computers, installation of new software is prohibited, sometimes even prevented through software applications, firewalls, and other security measures. Thus, if a publicly-accessible computer does not contain the productivity application, the user may effectively have no way of accessing the productivity application.

When a software-based productivity application is not installed on a given computer or is otherwise not available on the computer, a user may access a web-based productivity application over the Internet or other suitable network. The web-based productivity application may enable the user to create and edit various documents, thereby providing at least some of the same features as the software-based productivity application. Further, the web-based productivity application may be accessed via a standard web browser.

One feature commonly found in software-based productivity applications is the capability to search an external library or other suitable collection for a multimedia file and insert the multimedia file into a document being edited by the web-based productivity application. A number of approaches for implementing this functionality have been developed but are considered to be suboptimal. In a first approach, the user manually downloads the multimedia file from the external library and stores the multimedia file locally. The user then manually uploads the multimedia file from a local storage device into the web-based productivity application for insertion into the document. Among other problems, this approach is not suitable on publicly-accessible computers and other computers that do not allow the download and storage of files.

In a second approach, the user installs an ACTIVEX control or other web browser control on the web browser. The ACTIVEX control may be configured to aid in the retrieval of the multimedia file from the external library. Some web browsers, firewalls, and other security measure limit or block the installation of web browser controls, such as ACTIVEX controls, in order to prevent the installation of potentially malicious code. In a third approach, the user manually enters into the web-based productivity application a URL corresponding to the multimedia file. In this way, the web-based productivity application can directly download the multimedia file from the external library and insert the multimedia file into the document. Requiring the user to be aware of the URLs for every multimedia file and to manually insert the URLs into the web-based productivity application passes a substantial amount of work to the user and creates a poor user experience.

It is with respect to these considerations and others that the disclosure made herein is presented.

SUMMARY

Technologies are described herein for an improved method and system for inserting a multimedia file through a web-based desktop productivity application. In particular, through the utilization of the technologies and concepts presented herein, a user can insert a multimedia file into a document being edited via a web-based desktop productivity application with greater flexibility than with conventional methods. In particular, the technologies described herein do not require the user download and store the multimedia file on the user's computer, do not rely on a client-side ACTIVEX control, and do not require the user to manually enter uniform resource locators ("URLs") into the web-based desktop productivity application.

According to one aspect presented herein, a computer program inserts a multimedia file through a web-based desktop productivity application. The computer program receives a request for the multimedia file from a client computer over a network. The computer program transmits a request for the multimedia file to a server computer over the network. The request for the multimedia file may be transmitted via a proxy web service. In response to the request for the multimedia file, the computer program receives the multimedia file from the server computer over the network. The computer program inserts the multimedia file in a document edited by the web-based desktop productivity application. In one embodiment, the web-based desktop productivity application refreshes its display in order to show an updated view of the document including the inserted multimedia file.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 5A and 5B are flow diagrams showing an illustrative process for inserting the multimedia file through the web-based productivity application.

DETAILED DESCRIPTION

Figure 1:
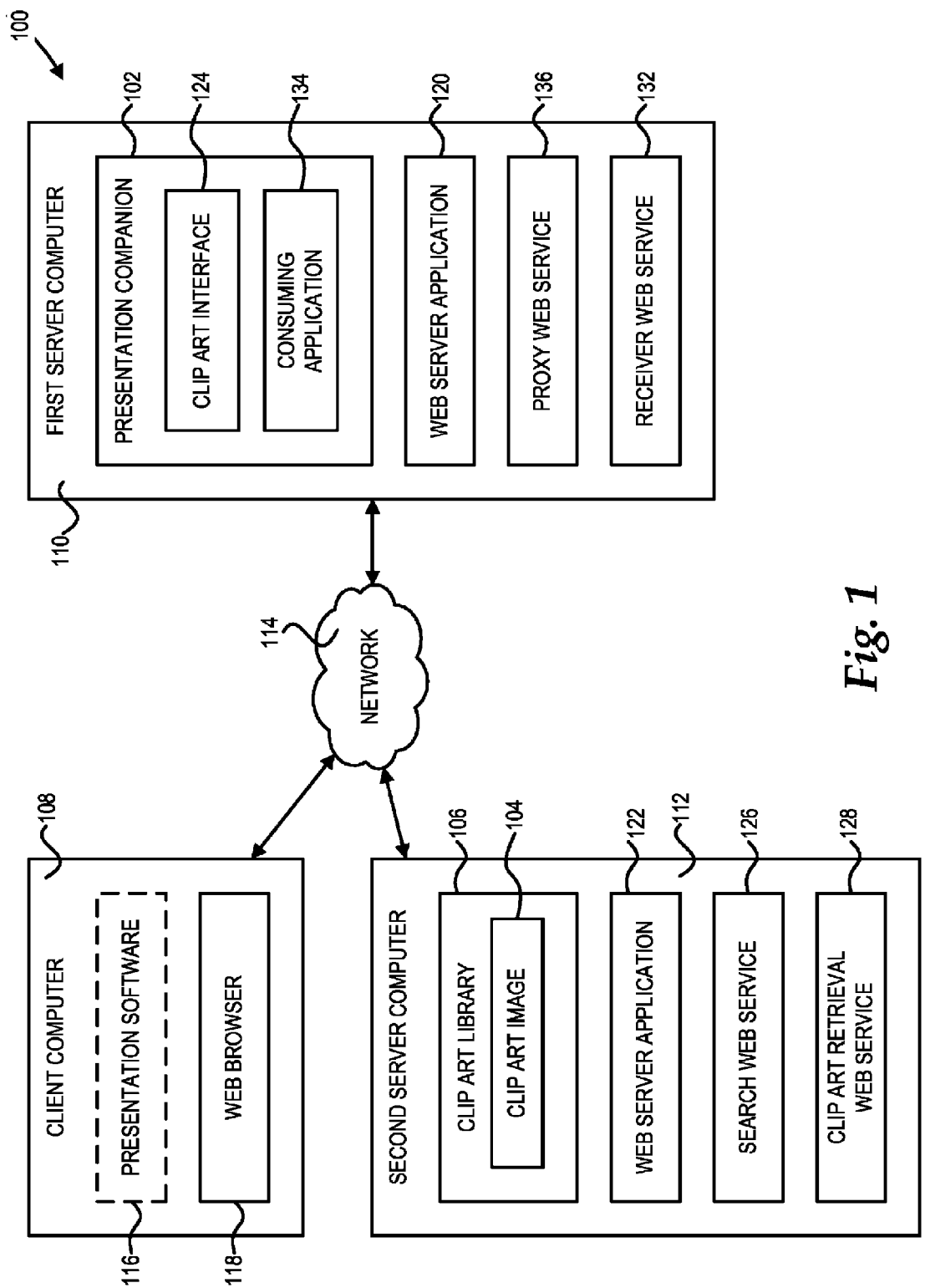
FIG. 1 is a block diagram illustrating a system for inserting a multimedia file through a web-based desktop productivity application, in accordance with one embodiment.

The following detailed description is directed to technologies for searching an external library for a multimedia file via a web-based desktop productivity application and inserting the multimedia file into a document edited by the web-based desktop productivity application. Through the utilization of the technologies and concepts presented herein, a user, while editing a document through a web-based desktop productivity application operating on one domain, may also search for a multimedia file stored in an external library operating on another domain. Once the user selects a multimedia file, the web-based desktop productivity application may retrieve the multimedia file directly from the external library and insert the multimedia file into the document as it is being edited.

It should be appreciated that the multimedia file is not stored on the user's computer. Further, the user does not download any ACTIVEX controls or other web browser controls. Thus, the technologies and concepts presented herein may be implemented on publicly-accessible computers and other computers where downloading content onto a computer is prohibited. Also, the actions by the web-based desktop productivity application to retrieve the multimedia files from the external library and insert the multimedia file into the document are transparent to the user. That is, the user is neither aware of the location of the multimedia file in the external library, nor aware that the web-based desktop productivity application and the external library operate on separate domains.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In cases where a user does not have access to a productivity application on a given computer, the user can access a web application that provides at least some of the functionality provided by the productivity application. According to exemplary embodiments, a productivity application may be provided in both a conventional software application for installation on a computer and a web application for access via a web browser. The software application is referred to herein as a productivity software application. The web application is referred to herein as a productivity companion application.

Generally, existing productivity companion applications do not provide the same level of functionality that the productivity software applications provide. One of the challenges with developing a fully functional productivity companion application is replicating the entire feature set of a corresponding productivity software application in light of various restrictions, such as the limitations of web browsers as well as network security measures that prevent the reception of malicious content across a network. Since replicating every feature on the productivity software application may be impractical, a more pragmatic approach may involve implementing selected features.

One popular and useful feature that is commonly found on a number of productivity software applications is the insertion of multimedia files, such as text, images, audio, video, and combinations thereof, from an external library into a document edited by the productivity software application. Examples of an external library of multimedia files include, but are not limited to, YOUTUBE from GOOGLE INC, FLICKR from YAHOO! INC., and MYSPACE from NEWS CORPORATION. Another example of an external library of multimedia files is the clip art gallery provided by OFFICE ONLINE from MICROSOFT CORPORATION. The OFFICE ONLINE clip art gallery currently provides access to over 150,000 clip art images and sounds for insertion into word processing documents, spreadsheet documents, presentation documents, and the like.

With a productivity software application, inserting a multimedia file from an external library into a document is relatively straight-forward. In particular, since the user has installed the productivity software application on a computer, it can generally be assumed that the user has full access to the computer. As such, a user may request a multimedia file from the external library via a uniform resource locator ("URL"), for example. The external library may respond to the request and transmit the multimedia file to the user's computer. Since the multimedia file is now stored, at least temporarily, on the user's computer, the user can then insert the multimedia file into the document via the productivity software application.

With a productivity companion application, however, providing access to an external library creates a variety of challenges. Generally, the productivity companion application is provided from one domain, while the external library is provided from another domain. For security, some web browsers prohibit a website provided by one domain to visit a website or access an application provided by another domain by implementing a web browser security measure.

One way around the web browser security measure is to copy the external library and provide the external library on the first domain. However, recreating the dedicated servers of established external libraries is time-consuming and cost-prohibitive. Another way around the web browser security measure is to access the external library with an ACTIVEX control or other suitable web browser control. However, some browsers and firewalls block ACTIVEX controls, which can be maliciously utilized in some instances. Further, some web usage policies prohibit users from even launching ACTIVEX controls.

Yet another way around the web browser security measure is to provide the user with direct link via a URL to the requested multimedia file. The user manually downloads the multimedia file from the external library using the URL and then manually uploads the multimedia file to the productivity companion application, which inserts the multimedia file into the document. However, placing the burden on the user to manually download and upload multimedia files creates a poor user experience. Also, the user may not have permission or capability to store downloaded multimedia files. For example, some publicly-accessible computers block the downloading and storage of multimedia files.

Embodiments described herein provide an approach that addresses at least some of the problems with the other approaches described above. In particular, the embodiments described herein provide an entirely server-side process that does not utilize any storage resources of the user's computer and does not require the user to install any web browser controls. Communications between the productivity companion application and the external library are made transparent to user. That is, the user is neither aware of the location (e.g., the URL) of the multimedia file, nor aware that the productivity companion application and the external library operate on separate domains.

In the following detailed description, references are made to the accompanying drawings that form a part hereof, and which are shown by way of illustration, specific embodiments, or examples. In particular, the embodiments described below refer primarily to clip art images stored in a clip art gallery. However, it should be appreciated that any suitable multimedia files stored on an external library may be similarly utilized. Further, the embodiments described below refer primarily to presentation applications, although other productivity applications may be utilized as well.

Referring now to the drawings, in which like numerals represent like elements through the several figures, aspects of a computing system and methodology for providing an enhanced presentation companion application will be described. Turning to FIG. 1, additional details will be provided regarding an implementation of a presentation companion application whereby a user can search for a clip art image stored in a remote clip art library and insert the clip art image directly into a presentation document edited by the presentation companion application. In particular, FIG. 1 shows aspects of a system 100 including a presentation companion application 102 configured to retrieve a clip art image 104 from a clip art library 106 and directly insert the clip art image 104 into a document edited by the presentation companion application 102. The system 100 includes a client computer 108, a first server computer 110, and a second server computer 112. The client computer 108, the first server computer 110, and the second server computer 112 are operatively connected via a network 114. The network 114 may be any suitable network, such as a local area network ("LAN"), a virtual private network ("LAN"), or the Internet. In one embodiment, the first server computer 110 and the second server computer 112 operate on separate domains.

In one embodiment, the client computer 108 is a standard desktop or laptop computer system capable of executing an operating system and one or more application programs. It should be appreciated, however, that in other embodiments the client computer 108 may be another type of computing device. For instance, according to embodiments, the client computer 108 may be a mobile computing device, such as a mobile telephone, a smartphone, an ultra-mobile personal computer, a tablet personal computer, or other suitable mobile computing device. Other devices may also be utilized in a similar manner.

According to embodiments, the client computer 108 is operative to execute a presentation software application 116 and other suitable productivity applications (e.g., a word processing application, a spreadsheet application). The presentation software application 116 may be any suitable software application capable of creating and editing a presentation document. The presentation document may include one or mores slides, for example. An exemplary presentation software application 116 is POWERPOINT from MICROSOFT CORPORATION. If the presentation software application 116 is not installed on the client computer 108, then a user may access the presentation companion application 102 on the first server computer 110. Like the presentation software application 116, the presentation companion application 102 is also capable of creating and editing a presentation document.

According to embodiments, the presentation companion application 102 is a web application that is embodied in a website. As such, the presentation companion application 102 is accessible via a standard web browser 118 executing on the client computer 108. It should be appreciated that although presentation companion application 102 is described herein as being accessible through the Internet, the presentation companion application 102 may also be made available on a private internal website (e.g., on an enterprise server). Moreover, although the presentation companion application 102 is described herein as being accessible through the web browser 118, the presentation companion application 102 may also be accessible through the use of another suitable client application capable of requesting and rendering the presentation companion application 102.

The first server computer 110 provides the presentation companion application 102 described herein. The second server computer 112 provides access to the clip art image 104 and other content stored in the clip art library 106. In one embodiment, the clip art library 106 is a database that stores a plurality of images and a plurality of corresponding thumbnail images (hereinafter "thumbnails") or other suitable representations of the plurality of images. Each of the thumbnails may be associated with one or more search terms and a URL. Each of the URLs may specify the location of the clip art image that corresponds to the given thumbnail.

The first server computer 110 and the second server computer 112 each comprise a standard computer system capable of executing an operating system and one or more application programs. In particular, the first server computer 110 executes the presentation companion application 102 and a web server application 120. The web server application 120 enables access to the presentation companion application 102 via a URL. Further, the second server computer 112 executes a web server application 122, which enables access to the clip art image 104 and other content stored in the clip art library 106 via a URL.

The presentation companion application 102 includes a clip art interface 124. In one embodiment, the clip art interface 124 is any suitable interface enabling a user to search for and select one of the clip art images, such as the clip art image 104, stored in the clip art library 106, for insertion into a presentation document edited by the presentation companion application 102. In particular, the clip art interface 124 may enable the user to enter a search term for searching the clip art images. The clip art interface 124 transmits the search term to a search web service 126 in the second server computer 112. In one embodiment, the search web service 126 is a web service configured to receive and respond to requests for searching the thumbnails stored in the clip art library 106. The search web service 126 may be a dedicated web service that is optimized to perform a fast and efficient search of the clip art library 106.

Upon receiving the search term, the search web service 126 responds by transmitting the corresponding thumbnails to the clip art interface 124, which displays the thumbnails to the user. The search web service 126 may also transmit URLs for each of the thumbnails, each URL specifying the location of the corresponding clip art image in the clip art library 106. The user may select one of the thumbnails to insert the corresponding clip art image into the presentation document. In one embodiment, selecting the thumbnail directly transmits an instruction to the clip art interface 124 to insert the corresponding clip art image into the presentation document. In another embodiment, selecting the thumbnail causes the clip art interface 124 to display metadata or other relevant information about the corresponding clip art image. The user may then transmit an instruction to the clip art interface 124 to insert the clip art image corresponding to the selected thumbnail image into the presentation document. The user may select one of the thumbnails using a mouse or other suitable input device.

To insert the clip art image into the presentation document, the clip art interface 124 sends a request for the clip art image to the a clip art retrieval web service 128. In particular, the clip art interface 124 may transmit the URL associated with the selected thumbnail to the clip art retrieval web service 128. In one embodiment, the clip art retrieval web service 128 is a web service configured to retrieve a clip art image from the clip art library 106. The web service is further configured to transmit the clip art image, such as the clip art image 104, to a receiver web service 132 in the first server computer 110.

Upon receiving the clip art image 104, the receiver web service 132 forwards the clip art image 104 to a consuming application 134 in the presentation companion application 102. In one embodiment, the consuming application 134 is configured to insert the clip art image 104 into the presentation document edited by the presentation companion application 102. The consuming application 134 may insert the clip art image 104 into a placeholder, which defines the location on a slide where the clip art image 104 is to be inserted. In one embodiment, the receiver web service 132 also validates the clip art image 104 received, thereby decreasing the possibility of malicious code being received.

For security reasons, a web browser may block requests made between different domains, such as the domains associated with the first server computer 110 and the second server computer 112. For example, the web browser 118 may block the search request made by the clip art interface 124 to the search web service 126. The web browser 118 may also block the clip art image retrieval request made by the clip art interface 124 to the clip art retrieval web service 128. This type of vulnerability is known as cross-site scripting ("XSS") and can be maliciously utilized if the vulnerability is not addressed. In order to work around the XSS security measures on the web browser 118, all requests between the first server computer 110 and the second server computer 112 are made through a proxy web service 136 on the first server computer 110. In one embodiment, the proxy web service 136 is a web service configured to receive a request from an application executing on the first server computer 110 and route the request to an application executing on the second server computer 112. By routing the requests through the proxy web service 136, the XSS security measures implemented on the web browser 118 can be effectively circumvented.

Figure 2:
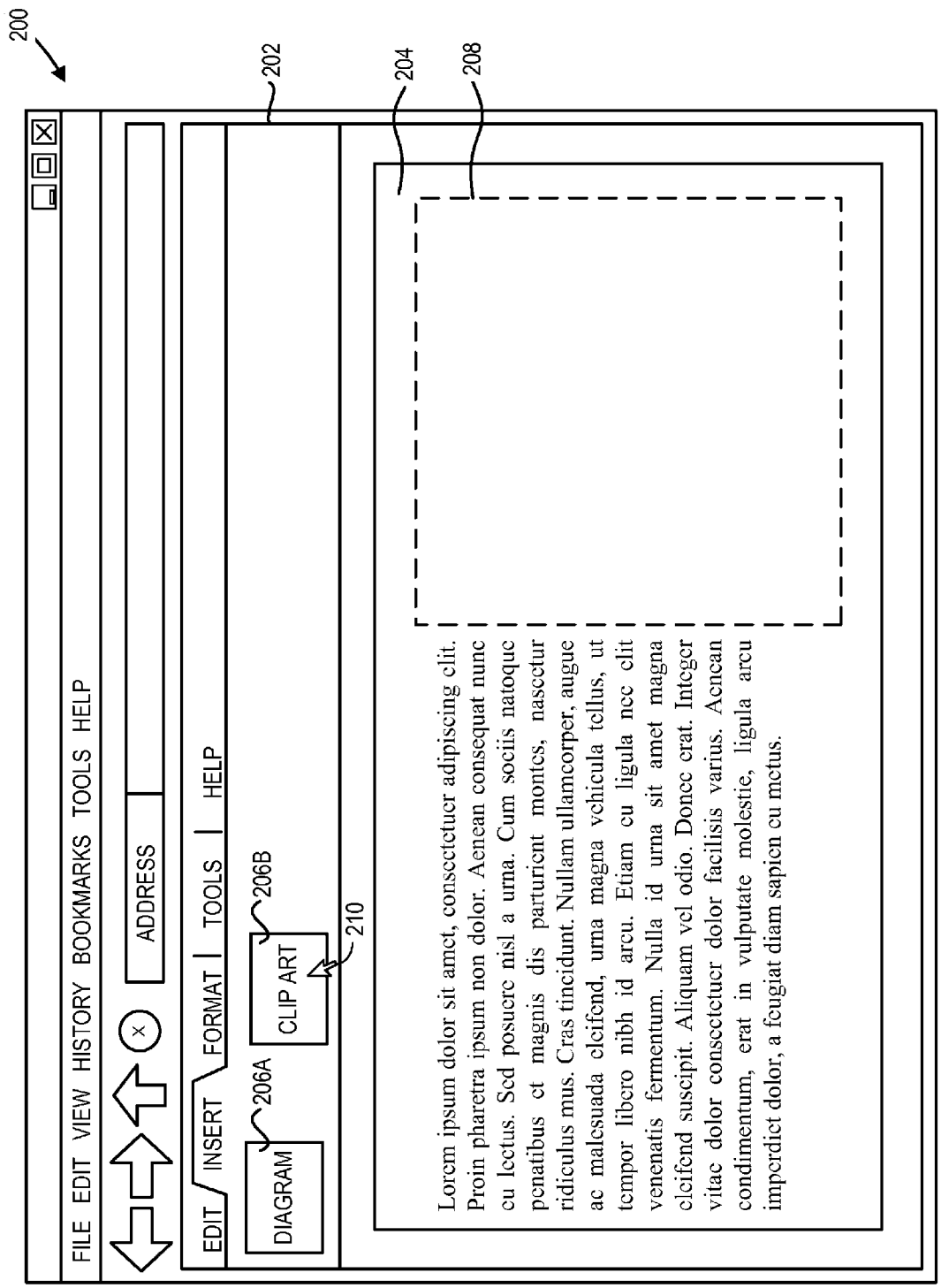
FIG. 2 is a screen display diagram showing a screenshot of an illustrative productivity companion application prior to the insertion of the multimedia file, in accordance with one embodiment.
Figure 3A:
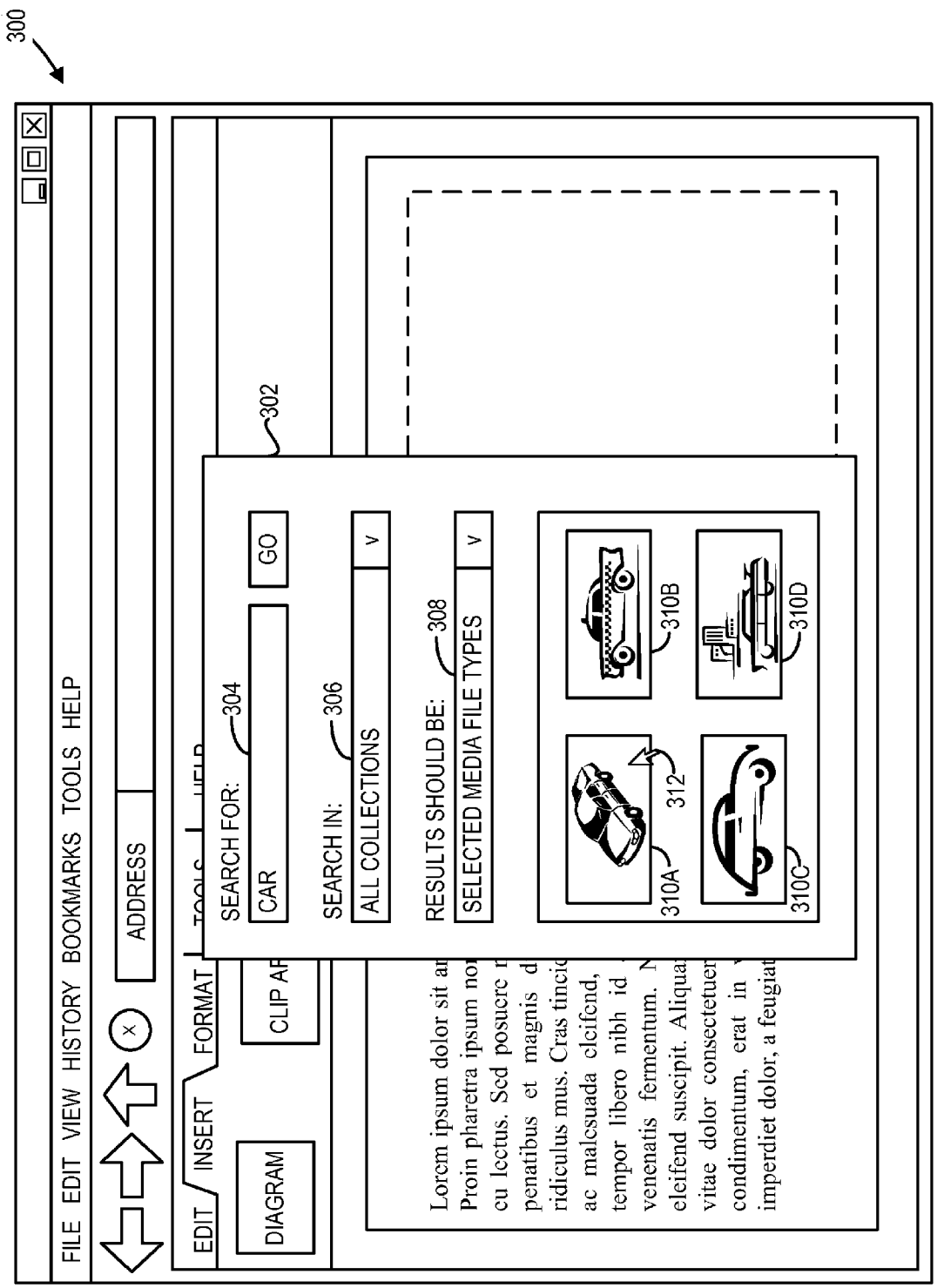
FIG. 3A is a screen display diagram showing a screenshot of one illustrative clip art interface, in accordance with one embodiment.
Figure 3B:
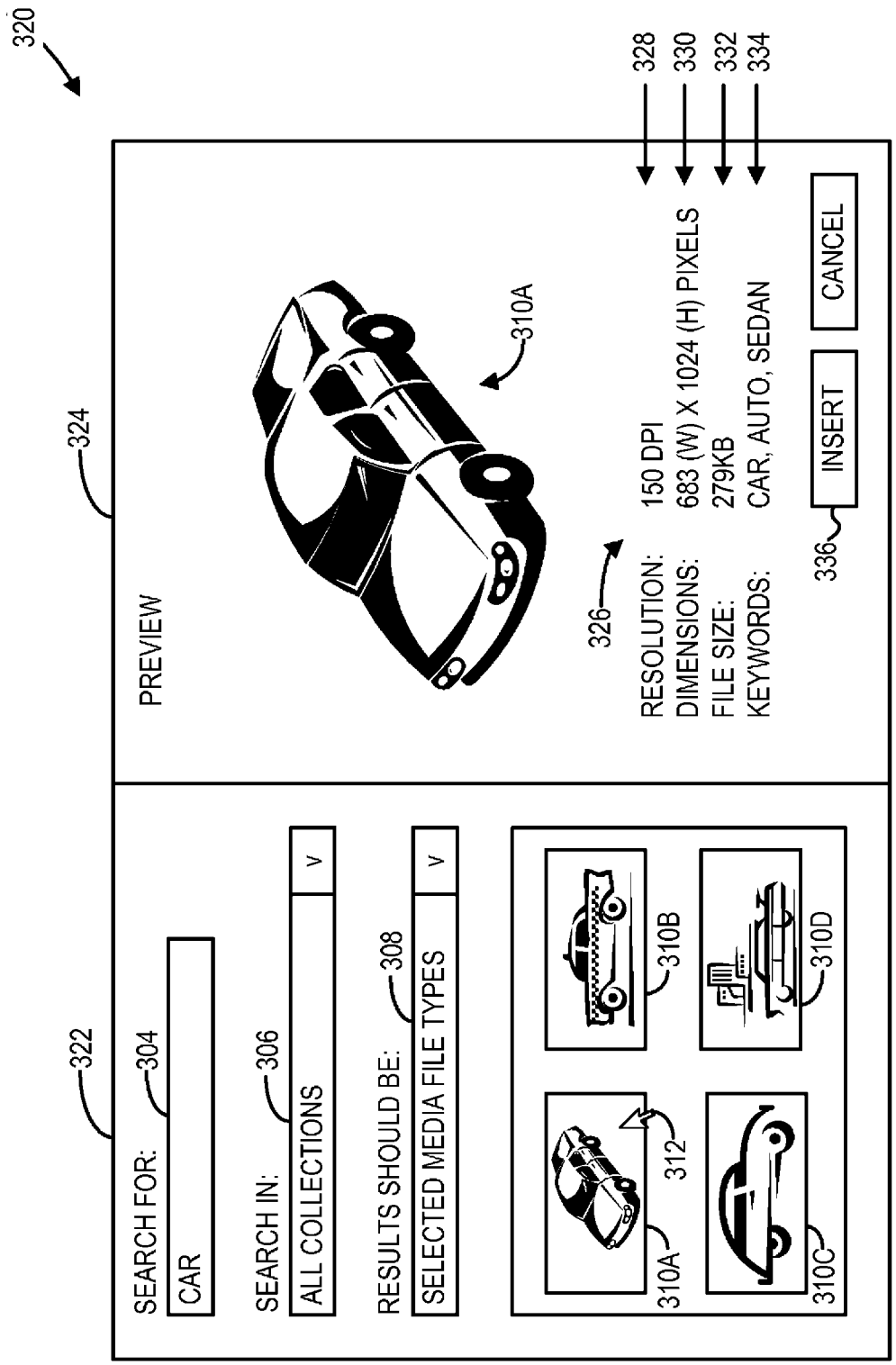
FIG. 3B is a screen display diagram showing a screenshot of another illustrative clip art interface, in accordance with one embodiment.
Figure 4:
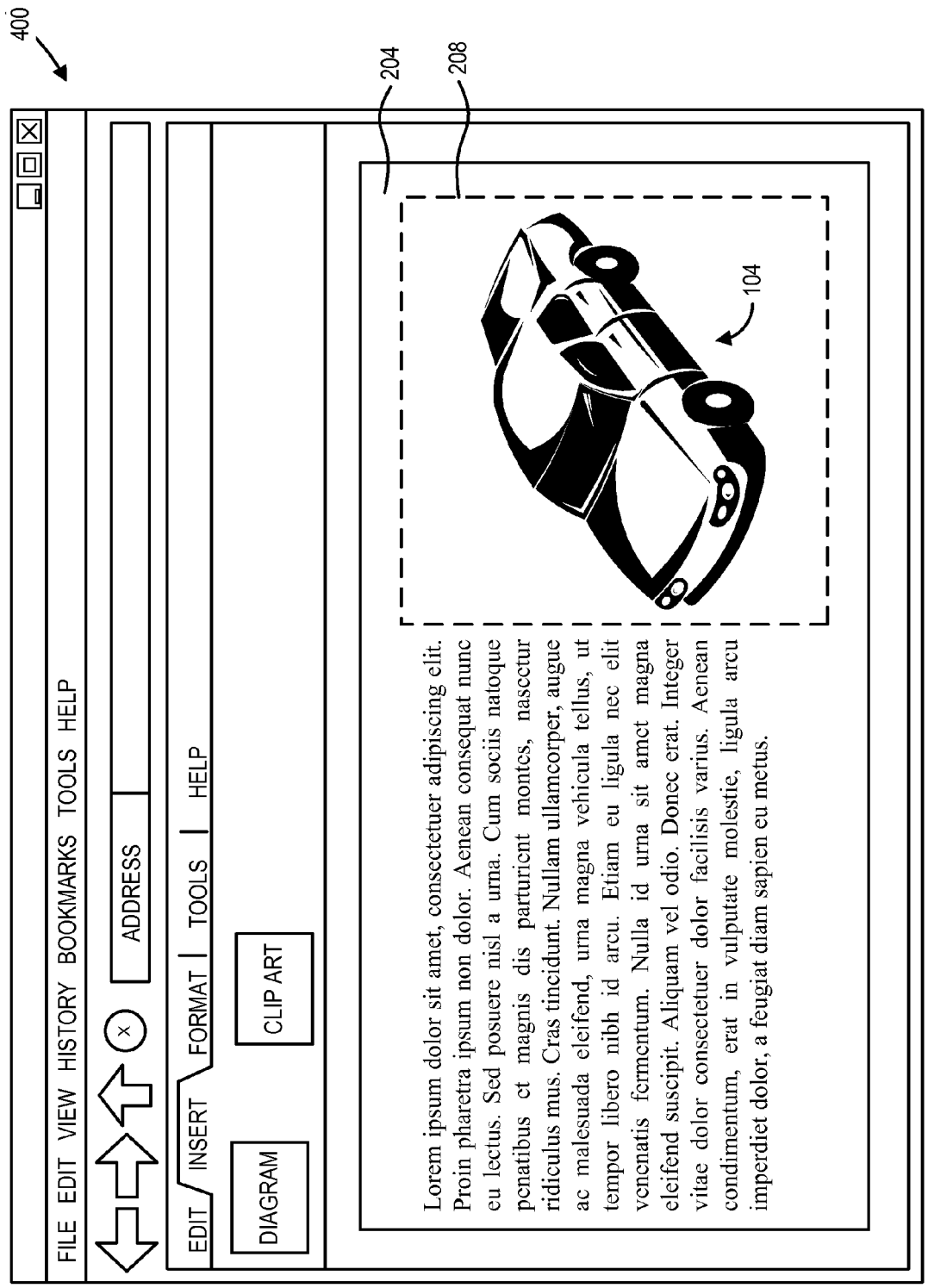
FIG. 4 is a screen display diagram showing another screenshot of the illustrative productivity companion application after the insertion of the multimedia file.

FIGS. 2-4 are screen display diagrams showing illustrative screen displays provided by the web browser 118 in various embodiments presented herein. In particular FIGS. 2-4 show an illustrative implementation of the presentation companion application 102 and the clip art interface 124. It should be appreciated that other implementations may be contemplated by those skilled in the art. Referring now to FIG. 2, additional details regarding the functionality provided by the presentation companion application 102 in one embodiment will be presented with reference to a screen display 200. The screen display 200 illustrates an exemplary implementation 202 of the presentation companion application 102 as rendered by the web browser 118. In particular, the implementation 202 includes user interfaces for creating and editing a presentation slide 204 (hereinafter "slide 204") within a presentation document. The slide 204 may contain virtually any type of multimedia content including, but not limited to, text, images, audio, video, and combinations thereof.

As shown in FIG. 2, the implementation 202 shows two user interface buttons 206A-206B, which may be selected by a user to insert different objects into the slide 204. The diagram insert button 206A enables the user to insert a diagram into the slide 204, and the clip art insert button 206B enables the user to insert a clip art image into the slide 204. Additional buttons for inserting other objects into the slide 204 may be contemplated by those skilled in the art and are not shown for the sake of simplicity. A placeholder 208 is provided in one embodiment to define the location on the slide 204 at which the selected object is placed. According to other embodiments, objects may be freely inserted at any location on the slide 204 without the use of the placeholder 208.

In an illustrative example, a user selects the clip art insert button 206B to initiate a process for placing a clip art image at the location of the placeholder 208. For example, a user may select the clip art insert button 206B using a mouse cursor 210 or other suitable user input device. Upon selecting the clip art insert button 206B, the presentation companion application 102 provides the clip art interface 124, which is then rendered by the web browser 118.

Referring now to FIG. 3A, additional details regarding one process for inserting a clip art image onto the slide 204 will be described. In particular, FIG. 3A shows a screen display 300 generated by the web browser 118 following the selection of the clip art insert button 206B. The screen display 300 illustrates an exemplary implementation 302 of the clip art interface 124 as rendered by the web browser 118. The implementation 302 includes a search box 304 for entering a search term. The implementation 302 also includes a collection selection menu 306, which is a drop-down menu for specifying a particular category of clip art images, and a media type menu 308, which is a drop-down menu for specifying a particular file type. Other search criteria may also be included as contemplated by those skilled in the art.

As illustrated in FIG. 3A, the user has entered the search term "car" into the search box 304. Upon entering the search term "car" into the search box 304, the clip art interface 124 transmits a request for a search based on the search term "car" to the search web service 126 via the proxy web service 136. The search web service 126 performs the search for thumbnail images stored in the clip art library 106 that correspond to the search term "car." The search web service 126 transmits the thumbnail images as well as URLs associating each of the thumbnail images with the corresponding clip art images also stored in the clip art library 106.

As shown in FIG. 3A, the implementation 302 receives four thumbnails 310A-310D from the search web service 126 and displays the thumbnails 310A-310D. Each of the thumbnails 310A-310D corresponds to the search term "car" that was entered into the search box 304. In an illustrative example, a user selects the thumbnail 310A corresponding to the clip art image to be inserted at the location of the placeholder 208. For example, a user may select the thumbnail 310A using a mouse cursor 312 or other suitable user input device.

Upon selecting the thumbnail 310A, the clip art interface 124 retrieves the corresponding clip art image, such as the clip art image 104, from the clip art library 106 based on the URL associated with the thumbnail 310A. In particular, the clip art interface 124 transmits a request for the clip art image 104 corresponding to the URL associated with the thumbnail 310A to the clip art retrieval web service 128 via the proxy web service 136. The clip art retrieval web service 128 retrieves the clip art image 104 from the clip art library 106 and transmits the clip art image 104 to the receiver web service 132. The receiver web service 132 forwards the clip art image 104 to the consuming application 134, which places the clip art image 104 onto the slide 204 at the location of the placeholder 208.

Referring now to FIG. 3B, additional details regarding another process for inserting a clip art image onto the slide 204 will be described. In particular, FIG. 3B illustrates another implementation 320 of the clip art interface 124 as rendered by the web browser 118. The implementation 320 includes two sections: a search window 322 and a preview window 324. The search window 322 includes essentially the same features as the implementation 302. The preview window 324 displays the thumbnail 310A and metadata 326 corresponding to the clip art image 104. In other embodiments, the preview window 324 may display the clip art image 104 or other suitable image instead of the thumbnail 310A.

As illustrated in FIG. 3B, the metadata 326 includes resolution information 328, dimension information 330, file size information 332, and keyword information 334. Other metadata and any other relevant information may be included in the metadata 326. The resolution information 328 indicates the resolution of the clip art image 104. The dimension information 330 indicates the dimensions of the clip art image 104. The file size information 332 indicates the file size of the clip art image 104. The keyword information 334 indicates different search terms that resolve to the clip art image 104. For example, the keyword information 334 indicates that search terms "car," "auto," and "sedan" each resolve to the clip art image 104.

As illustrated in FIG. 3B, the user has entered the search term "car" into the search box 304. Upon entering the search term "car" into the search box 304, the clip art interface 124 transmits a request for a search based on the search term "car" to the search web service 126 via the proxy web service 136. The search web service 126 performs the search for thumbnails stored in the clip art library 106 that correspond to the search term "car." The search web service 126 transmits the thumbnails as well as URLs associating each of the thumbnails with the corresponding clip art images also stored in the clip art library 106.

As shown in FIG. 3B, the implementation 302 receives four thumbnails 310A-310D from the search web service 126 and displays the thumbnails 310A-310D. Each of the thumbnails 310A-310D corresponds to the search term "car" that was entered into the search box 304. In an illustrative example, a user selects the thumbnail 310A to preview the corresponding clip art image 104 in the preview window 324. For example, a user may select the thumbnail 310A using a mouse cursor 312 or other suitable user input device.

Upon selecting the thumbnail 310A, the clip art interface 124 retrieves the metadata 326 corresponding to the clip art image 104. The metadata 326 may be retrieved from the clip art library 106 via the search web service 126 provided by the second server computer 112. Other suitable databases and web services may be similarly utilized. The preview window 324 displays the thumbnail 310A and the metadata 326. Upon viewing the preview window 324, a user may decide to view other metadata for other thumbnails, such as thumbnails 310B, 310C, 310D. For example, the user may select thumbnail 310B to view metadata corresponding to the thumbnail 310B in the preview window 324.

Alternatively, the user may decide to insert the clip art image 104 corresponding to the thumbnail 310 at the location of the placeholder 208 by selecting an insert button 336. Upon selecting the insert button 336, the clip art interface 124 retrieves the clip art image 104 from the clip art library 106 based on the URL associated with the thumbnail 310A. In particular, the clip art interface 124 transmits a request for the clip art image 104 corresponding to the URL associated with the thumbnail 310A to the clip art retrieval web service 128 via the proxy web service 136. The clip art retrieval web service 128 retrieves the clip art image 104 from the clip art library 106 and transmits the clip art image 104 to the receiver web service 132. The receiver web service 132 forwards the clip art image 104 to the consuming application 134, which places the clip art image 104 onto the slide 204 at the location of the placeholder 208.

Referring now to FIG. 4, additional details regarding one process for inserting a clip art image onto the slide 204 will be described. In particular, FIG. 4 shows a screen display 400 generated by the web browser 118 following the insertion of the clip art image 104 corresponding to the thumbnail 310A. The clip art image 104 is placed at the location of the placeholder 208 within the slide 204. Alternatively, the clip art image 104 may be placed at any suitable location within the slide 204.

Figure 5A:
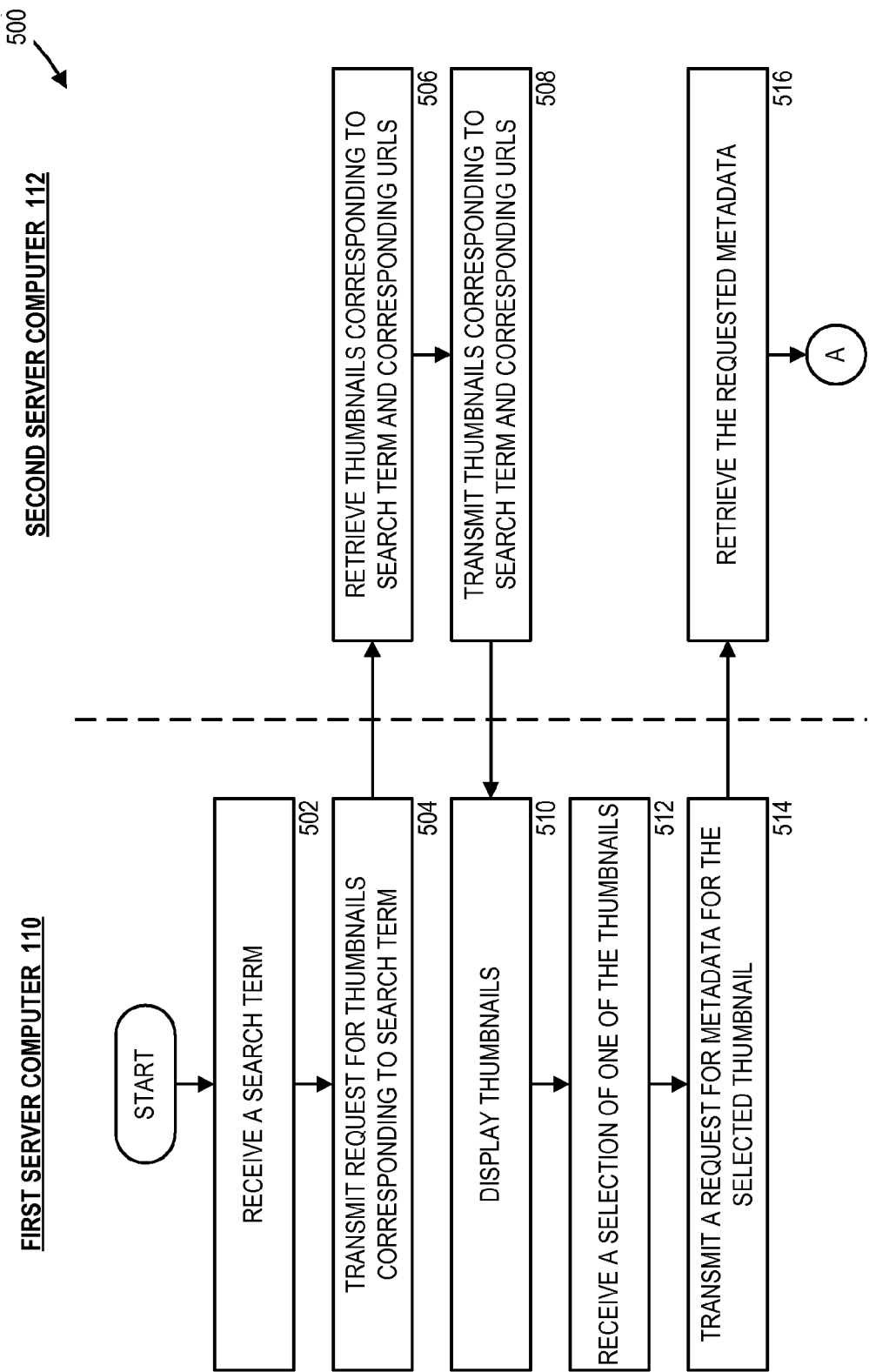

Referring now to FIGS. 5A and 5B, additional details will be provided regarding the embodiments presented herein for retrieving a clip art image from a remote clip art library and inserting the clip art image into a presentation document via a presentation companion application. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Referring to FIG. 5A, a routine 500 begins at operation 502 where the clip art interface 124 in the first server computer 110 receives a search term from a user. Upon receiving the search term, at operation 504, the clip art interface 124 transmits, to the search web service 126 at the second server computer 112, a request for thumbnails corresponding to the search term. In one embodiment, the request for thumbnails is sent through the proxy web service 136 to circumvent XSS security measures by the web browser 118.

The routine 500 proceeds to operation 506, where the search web service 126 receives the request for thumbnails and retrieves the thumbnails corresponding to the search term from the clip art library 106. The search web service 126 also receives a URL corresponding to each of the thumbnails. Each URL specifies the location at clip art library 106 where the clip art image corresponding to the given thumbnail is located. Upon retrieving the relevant thumbnails and URLs, at operation 508, the search web service 126 transmits the thumbnails and URLs to the clip art interface 124.

The routine 500 proceeds to operation 510, where the clip art interface 124 displays the thumbnails. A user may select a clip art image to preview metadata corresponding to the clip art image. At operation 512, the clip art interface 124 receives a selection of one of the thumbnails from the user. Upon receiving the selection of one of thumbnails, at operation 514, the clip art interface 124 transmits a request to the clip art library 106 or other suitable database for metadata corresponding to the selected thumbnail. For example, the request may be made through the search web service 126 or other suitable web service. The search web service 126, at operation 516, retrieves the requested metadata from the clip art library 106.

The routine proceeds to operation 518 of FIG. 5B, where the search web service 126 transmits the requested metadata to the clip art interface 124. The clip art interface 124, at operation 520, displays the requested metadata to the user. After viewing the metadata corresponding to the selecting thumbnail, at operation 522, the user may request that the clip art image corresponding to the selected thumbnail be inserted into the presentation document. Upon receiving the request to insert the clip art image corresponding to the selected thumbnail, at operation 524, the clip art interface 124 transmits, to the clip art retrieval web service 128 at the second server computer 112, a request to retrieve the clip art image corresponding to the selected thumbnail. In particular, the clip art interface 124 transmits the URL associated with the selected thumbnail.

The routine 500 proceeds to operation 526, where the clip art retrieval web service 128 receives the URL and retrieves, from the clip art library 106, the clip art image corresponding to the URL. Upon retrieving the clip art image, at operation 528, the clip art retrieval web service 128 transmits the clip art image to the receiver web service 132 at the first server computer 110. The receiver web service 132 forwards the clip art image to the consuming application 134, which at 530 inserts the clip art image into a presentation document. For example, the consuming application 134 may place the clip art image on a placeholder, such as the placeholder 208, as specified by the user.

Figure 6:
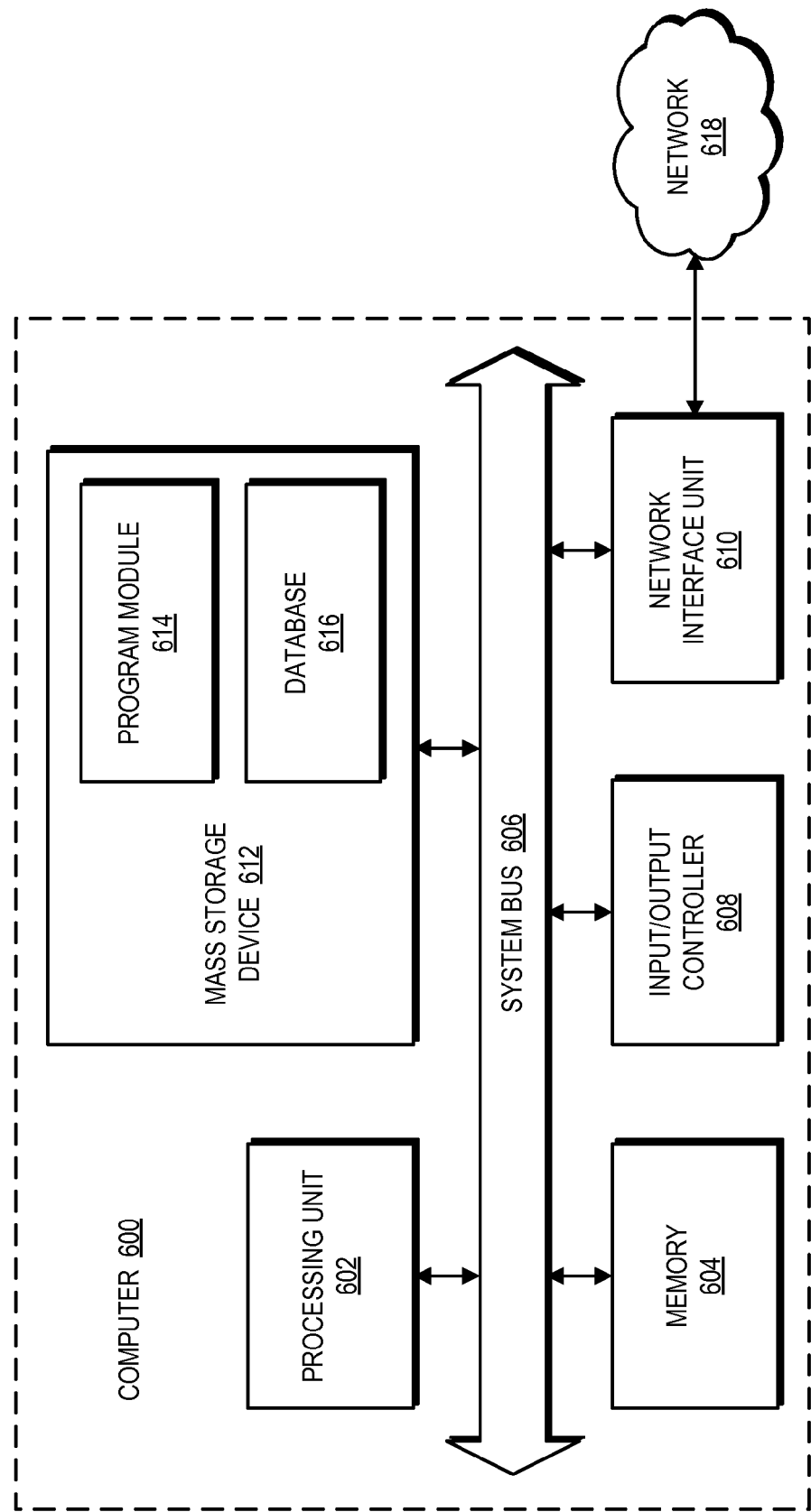
FIG. 6 is a computer architecture diagram showing aspects of an illustrative computer hardware architecture for a computing system capable of implementing aspects of the embodiments presented herein.

Referring now to FIG. 6, an exemplary computer architecture diagram showing aspects of a computer 600 is illustrated. The computer 600 includes a processing unit 602 ("CPU"), a system memory 604, and a system bus 606 that couples the memory 604 to the CPU 602. The computer 600 further includes a mass storage device 612 for storing one or more program modules 614 and one or more databases 616. Examples of the program module 614 include the presentation companion application 102 and the web server application 120. The mass storage device 612 is connected to the CPU 602 through a mass storage controller (not shown) connected to the bus 606. The mass storage device 612 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable media can be any available computer storage media that can be accessed by the computer 600.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network 618, such as the network 114. The computer 600 may connect to the network 618 through a network interface unit 610 connected to the bus 606. It should be appreciated that the network interface unit 610 may also be utilized to connect to other types of networks and remote computer systems. The computer 600 may also include an input/output controller 608 for receiving and processing input from a number of input devices (not shown), including a keyboard, a mouse, a microphone, and a game controller. Similarly, the input/output controller 608 may provide output to a display or other type of output device (not shown).

Based on the foregoing, it should be appreciated that technologies for inserting a multimedia file through a web-based desktop productivity application are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for inserting a multimedia file through a web-based desktop productivity application, comprising:
  receiving, at a first server computer, a request for the multimedia file from a client computer over a network, the client computer configured to display the web-based desktop productivity application via a web browser;

upon receiving the request for the multimedia file, transmitting the request for the multimedia file from the first server computer to a second server computer over the network, the request for the multimedia file being transmitted via a proxy web service executing on the first server computer, the proxy web service configured to circumvent cross-site scripting security measures on the web browser;

receiving, at the first server computer, the multimedia file from the second server computer over the network upon transmitting the request for the multimedia file, wherein receiving, at the first server computer, the multimedia file from the second server computer over the network upon transmitting the request for the multimedia file comprises receiving, at the first server computer, the multimedia file at a receiver web service executing on the first server computer, the receiver web service configured to forward the multimedia file to the web-based desktop productivity application for inserting into the document, wherein the web-based desktop productivity application inserts the multimedia file onto a placeholder within the document, the placeholder being specified by the client computer; and inserting, at the first server computer, the multimedia file in a document edited by the web-based desktop productivity application.

2. The method of claim 1, wherein the multimedia file comprises a clip art image and the second server computer comprises a clip art library.

3. The method of claim 1, wherein receiving, at a first server computer, a request for the multimedia file from a client computer over a network comprises:

receiving, at the first server computer, a search term from the client computer over the network;

upon receiving the search term, transmitting a request for representations corresponding to the search term from the first server computer to the second server computer over the network, the request for the representations being transmitted via the proxy web service;

receiving, at the first server computer, the representations from the second server computer over the network upon transmitting the request for representations; and displaying the representations.

4. The method of claim 3, wherein transmitting a request for representations corresponding to the search term from the first server computer to the second server computer over the network comprises transmitting the request for representations of multimedia fields corresponding to the search term from the first server computer to a search web service at the second server computer, the search web service comprising a dedicated web service for searching the representations.

5. The method of claim 3, wherein the representations comprise thumbnail images.

6. The method of claim 3, wherein receiving, at a first server computer, a request for the multimedia file from a client computer over a network comprises receiving, at the first server computer, a selection of one of the representations upon displaying the representations.

7. The method of claim 6, wherein each of the representations is associated with a uniform resource locator (URL), each of the URLs specifying a location of the multimedia file corresponding to the representation.

8. The method of claim 7, wherein transmitting the request for the multimedia file from the first server computer to a second server computer over the network comprises transmitting the URL corresponding to the selected representation from the first server computer to a file retrieval web service at the second server computer, the file retrieval web service comprising a dedicated web service for retrieving the multimedia files.

9. The method of claim 1, wherein the network comprises an enterprise network.

10. A method for inserting a multimedia file through a web-based desktop productivity application, comprising:

receiving, at a first server computer, a search term from a client computer over a network;

upon receiving the search term, transmitting a request for representations corresponding to the search term from the first server computer to a second server computer over the network, the request for the representations being transmitted via a proxy web service executing on the first server computer, the proxy web service configured to circumvent cross-site scripting security measures on the web browser, wherein each of the representations is associated with a uniform resource locator (URL), each of the URLs specifying a location of the multimedia file corresponding to the representation;

transmitting a request for the multimedia file from the first server computer to a second server computer over the network comprises transmitting the URL corresponding to the selected representation from the first server computer to a file retrieval web service at the second server computer, the file retrieval web service comprising a dedicated web service for retrieving the multimedia files;

receiving, at the first server computer, the representations from the second server computer over the network upon transmitting the request for representations;

displaying the representations through the web-based desktop productivity application;

receiving, at the first server computer, a selection of one of the representations from the client computer over the network upon displaying the representations;

upon receiving the selection of one of the representations, transmitting a request for the multimedia file corresponding to the selected representation from the first server computer to the second server computer over the network, the request for the multimedia file being transmitted via the proxy web service;

receiving, at the first server computer, the multimedia file from the second server computer over the network upon transmitting the request for the multimedia file; and inserting, at the first server computer, the multimedia file in a document edited by the web-based desktop productivity application.

11. The method of claim 10, wherein the multimedia file comprises a clip art image and the server computer comprises a clip art library.

12. The method of claim 11, wherein the representations comprise thumbnail images.

13. The method of claim 10, wherein the web-based desktop productivity application comprises a web-based word processing application, a web-based spreadsheet application, or a web-based presentation application.

14. A computer-readable storage medium not being a signal and having computer-executable instructions stored thereon which, when executed by a computer, cause the computer to:

receive, at a first server computer, a search term from a client computer over a network, the client computer executing a web browser displaying a web-based desktop productivity application;

upon receiving the search term, transmit a request for thumbnail images corresponding to the search term from the first server computer to a second server computer over the network, the request for the thumbnail images being transmitted via a proxy web service executed on the first server computer, the proxy web service configured to circumvent cross-site scripting security measures on the web browser;

receive, at the first server computer, the thumbnail images from the server computer over the network upon transmitting the request for thumbnail images;

display the thumbnail images through the web-based desktop productivity application;

receive, at the first server computer, a selection of one of the thumbnail images from the client computer over the network upon displaying the thumbnail images;

upon receiving the selection of one of the thumbnail images, transmit a request for metadata corresponding to a clip art image from the first server computer to the second server computer over the network, the clip art image corresponding to the selected thumbnail image, the request for metadata being transmitted via the proxy web service, wherein each of the thumbnail images is associated with a uniform resource locator (URL), each of the URLs specifying a location of the clip art image corresponding to the thumbnail image;

transmit a request for a clip art image corresponding to the selected thumbnail image from the first server computer to the second server computer over the network, the computer-executable instructions stored thereon which, when executed by a computer, cause the computer to transmit the URL corresponding to the selected thumbnail image from the first server computer to a file retrieval web service at the second server computer, the file retrieval web service comprising a dedicated web service for retrieving the clip art image;

receive, at the first server computer, the metadata from the second server computer over the network upon transmitting the request for the metadata;

display the metadata through the web-based desktop productivity application;

receive, at the first server computer, an instruction to insert the clip art image into a document edited by the web-based desktop productivity application from the client computer over the network;

transmit a request for the clip art image from the first server computer to the second server computer over the network upon receiving the instruction;

receive, at the first server computer, the clip art image from the second server computer over the network upon transmitting the request for the clip art image; and insert, at the first server computer, the clip art image in the document edited by the web-based desktop productivity application.

\* \* \* \* \*